（12） United States Patent
Terashima et al.

(10) Patent No.: US 11,387,495 B2
(45) Date of Patent: Jul. 12, 2022

(54) NON-AQUEOUS ELECTROLYTE SECONDARY BATTERY

(71) Applicant: TOYOTA JIDOSHA KABUSHIKI KAISHA, Toyota (JP)

(72) Inventors: Junpei Terashima, Nagoya (JP); Kazuma Abe, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 182 days.

(21) Appl. No.: 16/660,097

(22) Filed: Oct. 22, 2019

(65) Prior Publication Data

US 2020/0144675 A1  May 7, 2020

(30) Foreign Application Priority Data

Nov. 6, 2018 (JP) .............................. JP2018-209038

(51) Int. Cl.
*H01M 10/0587* (2010.01)
*H01M 10/05* (2010.01)

(52) U.S. Cl.
CPC ........ *H01M 10/0587* (2013.01); *H01M 10/05* (2013.01); *Y02E 60/10* (2013.01)

(58) Field of Classification Search
CPC .... H01M 10/05; H01M 10/0587; Y02E 60/10
USPC .......................................................... 429/94
See application file for complete search history.

(56) References Cited

U.S. PATENT DOCUMENTS

| 2009/0130548 A1* | 5/2009 | Lee ................... H01M 10/0431 429/161 |
| 2011/0027636 A1 | 2/2011 | Lee et al. |
| 2012/0202097 A1 | 8/2012 | Kimura et al. |
| 2015/0243977 A1* | 8/2015 | Hirose .................. H01M 4/485 429/213 |
| 2017/0162913 A1* | 6/2017 | Ohashi ............. H01M 10/0431 |

FOREIGN PATENT DOCUMENTS

| JP | 2007-335165 A | 12/2007 |
| JP | 2010-287513 A | 12/2010 |
| JP | 2014-179334 A | 9/2014 |
| JP | 2017-059395 A | 3/2017 |
| JP | 2017-103111 A | 6/2017 |
| JP | 2019-067653 A | 4/2019 |
| WO | 2011/036960 A1 | 3/2011 |

* cited by examiner

*Primary Examiner* — Jonathan G Jelsma
*Assistant Examiner* — Omar M Kekia
(74) *Attorney, Agent, or Firm* — Oliff PLC

(57) ABSTRACT

A non-aqueous electrolyte secondary battery includes a wound electrode body in which a first and a second separator, and a negative and a positive electrode body are stacked and wound. The wound electrode body has two R portions and is positioned in a flat portion. In a cross section orthogonal to a winding axis, when a distance from a bending end straight line to the winding starting end of the negative electrode body in a reference direction is denoted by A, a distance from the bending end straight line to the winding starting end of the positive electrode body in the reference direction is denoted by B, and X represents a distance from the bending end straight line to the winding end of the negative electrode body in the reference direction in the cross section is denoted by X, A, B, and X satisfy Condition: A<B<X.

3 Claims, 4 Drawing Sheets

NON-AQUEOUS ELECTROLYTE SECONDARY BATTERY

CROSS-REFERENCE TO RELATED APPLICATIONS

The present application claims priority based on Japanese Patent Application No. 2018-209038 filed on Nov. 6, 2018, the entire contents of which are incorporated herein by reference in its entirety.

BACKGROUND OF THE INVENTION

1. Field of the Invention

The present invention relates to a non-aqueous electrolyte secondary battery.

2. Description of the Related Art

A non-aqueous electrolyte secondary battery such as a lithium ion secondary battery is light and is capable of obtaining high energy density, and hence the non-aqueous electrolyte secondary battery is widely used as a portable power source for a personal computer or a cellular phone, or a power source for driving a vehicle such as an electric vehicle (EV), a hybrid vehicle (HV), or a plug-in hybrid vehicle (PHV). For example, the lithium ion secondary battery described in Japanese Patent Application Publication No. 2017-59395, which is an example of the non-aqueous electrolyte secondary battery, includes a wound electrode body. In the wound electrode body, a positive electrode plate, a first separator, a negative electrode plate, and a second separator are stacked and wound.

SUMMARY

In the non-aqueous electrolyte secondary battery, when a gap is present in the wound electrode body (e.g., between the positive electrode plate and the separator or between the negative electrode plate and the separator), there are cases where variations occur in current density. When variations occur in current density, a difference in electrical resistance may be locally caused and ions (e.g., lithium ions or the like) in a non-aqueous electrolyte may be deposited as metal on a negative electrode. There are cases where the deposition of the metal leads to a reduction in battery performance. Consequently, it is preferable to prevent the reduction in battery performance by preventing the deposition of the metal.

A typical object of the present invention is to provide a non-aqueous electrolyte secondary battery capable of reducing gaps in a wound electrode body to prevent deposition of metal.

In order to achieve the above object, a non-aqueous electrolyte secondary battery of an aspect disclosed herein includes a wound electrode body in which a first separator, a negative electrode body, a second separator, and a positive electrode body are stacked and wound. The wound electrode body has two R portions which are both end portions in a longitudinal direction orthogonal to a winding axis, in which outer surfaces of the wound electrode body are formed of curved surfaces, and a flat portion which is a central portion disposed between the two R portions and has two flat surfaces. A winding starting end of the positive electrode body, a winding starting end of the negative electrode body, and a winding ending end of the negative electrode body are positioned in the flat portion. A first bending point represents a primary bending point from winding starting ends of the first separator and the second separator and a second bending point represents a secondary bending point from the winding starting ends are provided in a cross section orthogonal to the winding axis. A distance from a bending end straight line, which is a straight line which passes through the second bending point and is orthogonal to the two flat surfaces, to the winding starting end of the negative electrode body in a reference direction in which the flat surfaces extend in the cross section is denoted by A. A distance from the bending end straight line to the winding starting end of the positive electrode body in the reference direction in the cross section is denoted by B. A distance from the bending end straight line to the winding ending end of the negative electrode body in the reference direction in the cross section is denoted by X. At this point, A, B, and X satisfy the following relationship:

$$A<B<X.$$

According to the non-aqueous electrolyte secondary battery of the present disclosure, in the cross section orthogonal to the winding axis, the winding starting end of the negative electrode body, the winding starting end of the positive electrode body, and the winding ending end of the negative electrode body are disposed at positions close to the bending end straight line such that the winding starting end of the negative electrode body is closer to the bending end straight line than the winding starting end of the positive electrode body, and the winding starting end of the positive electrode body is closer to the bending end straight line than the winding ending end of the negative electrode body, and the positions are displaced from each other in the reference direction. With this, gaps in the winding electrode body are reduced. The gaps in the wound electrode body include, e.g., at least any of the gap between the winding starting end of the negative electrode body and the separator, the gap between the winding starting end of the positive electrode body and the separator, and the gap between the winding ending end of the negative electrode body and the separator. Therefore, it is possible to reduce the possibility that variations occur in current density in the winding electrode body, and a difference in electrical resistance is locally caused. With this, it is possible to prevent ions in a non-aqueous electrolyte from being deposited as metal to prevent a reduction in battery performance.

In a more preferred aspect of the non-aqueous electrolyte secondary battery disclosed herein, when a length of the flat portion between the first bending point and the second bending point in the cross section is denoted by L, A, B, X, and L satisfy the following relationships:

$$0 \leq A/L \leq 0.15;$$

$$0.025 \leq B/L \leq 0.375; \text{ and}$$

$$0.05 \leq X/L.$$

According to such a configuration, it is possible to further prevent the deposition of the metal to further prevent the reduction in battery performance.

In another preferred aspect of the non-aqueous electrolyte secondary battery disclosed herein, the winding starting ends of each of the first separator and the second separator are positioned in the flat portion. The first separator and the second separator are folded back at the first bending point, and are then folded back to a side opposite to the winding starting ends of the first separator and the second separator at the second bending point and are wound. A length of the flat portion between the first bending point and the second bending point in the cross section is denoted by L. A distance from the bending end straight line to the winding starting end of the first separator in the reference direction in the cross section is denoted by C. A distance from the bending end straight line to the winding starting end of the second separator in the reference direction in the cross section is denoted by D. At this point, C, D, L, and X satisfy the following relationships:

$$X \leq C < L; \text{ and}$$

$$X \leq D < L.$$

In this case, the gaps in the wound electrode body including the gap between the winding starting end of the negative electrode body and the separator are reduced more. Consequently, it is possible to further prevent the deposition of the metal to further prevent the reduction in battery performance.

DETAILED DESCRIPTION OF THE PREFERRED EMBODIMENTS

Figure 1:
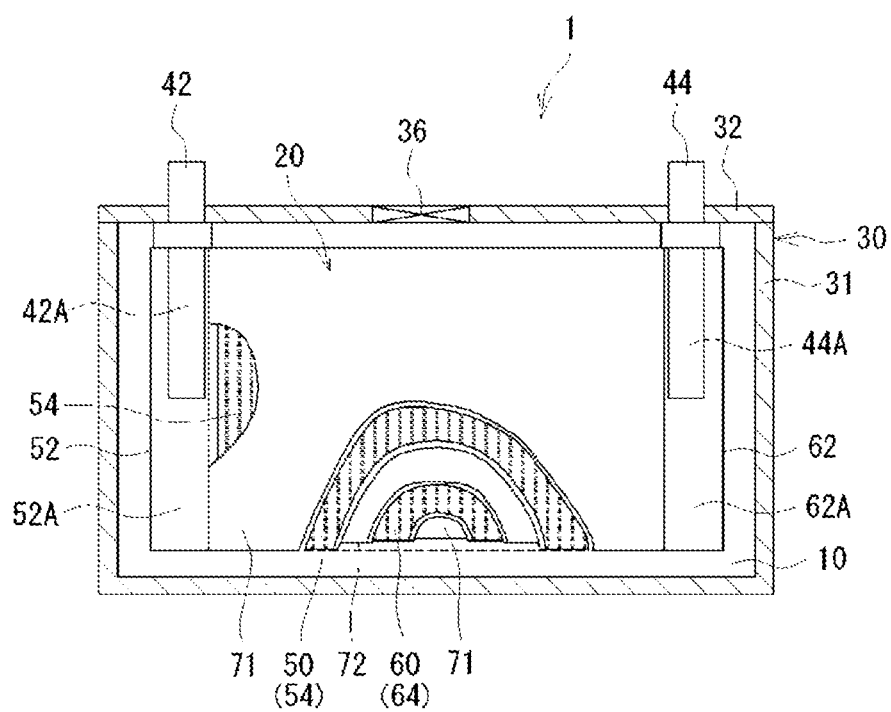
FIG. 1 is a cross-sectional view schematically showing the internal structure of a non-aqueous electrolyte secondary battery 1 of the present embodiment.

Hereinbelow, one of typical embodiments in the present disclosure will be described in detail with reference to the drawings. Note that, apart from matters which are specifically mentioned in this specification, other matters which are necessary for implementation can be understood as design matters of those skilled in the art based on the conventional art in the field. The present invention can be implemented based on contents disclosed in the present specification and common general technical knowledge in the field. Note that, in the following drawings, members and portions which have the same functions are designated by the same reference numerals, and the description thereof is made. In addition, dimensional relationships (length, width, thickness, and the like) in the individual drawings do not necessarily reflect actual dimensional relationships.

In the present specification, a "battery" is a term which denotes ordinary storage devices capable of extracting electrical energy, and is a concept including a primary battery and a secondary battery. A "secondary battery" denotes ordinary storage devices which can be charged and discharged repeatedly, and includes a capacitor (i.e., a physical electric cell) such as an electric double-layer capacitor in addition to a so-called storage battery (i.e., an electrochemical cell) such as a lithium ion secondary battery, a nickel-metal hydride battery, or a nickel-cadmium battery. Hereinbelow, a non-aqueous electrolyte secondary battery according to the present disclosure will be described in detail by using, as an example, a flat square lithium ion secondary battery which is a type of the non-aqueous electrolyte secondary battery. Note that the non-aqueous electrolyte secondary battery according to the present disclosure is not intended to be limited to the non-aqueous electrolyte secondary battery described in the following embodiment.

Configuration of Non-Aqueous Electrolyte Secondary Battery

A non-aqueous electrolyte secondary battery 1 shown in FIG. 1 is a sealed lithium ion secondary battery which includes a wound electrode body 20, a non-aqueous electrolyte 10, and a battery case 30. The battery case 30 accommodates the wound electrode body 20 and the non-aqueous electrolyte 10 such that the wound electrode body 20 and the non-aqueous electrolyte 10 are sealed inside the battery case 30. The shape of the battery case 30 in the present embodiment is a flat square shape. The battery case 30 includes a box-like main body 31 having an opening portion at one end, and a plate-like lid 32 which covers the opening portion of the main body. In the battery case 30 (specifically, the lid 32 of the battery case 30), a positive electrode terminal 42 and a negative electrode terminal 44 for external connection, and a safety valve 36 are provided. In the case where the internal pressure of the battery case 30 rises to a predetermined level or higher, the safety valve 36 releases the internal pressure. In addition, in the battery case 30, an injection opening (not shown) for injecting the non-aqueous electrolyte 10 into the inside is provided. As the material of the battery case 30, for example, a metal material such as aluminum which is light and has high thermal conductivity is used. Note that the configuration of the battery case can be changed. For example, as the battery case, a laminate having flexibility may be used. In addition, the battery case may have a shape (e.g., a cylindrical shape) other than the square shape.

Figure 2:
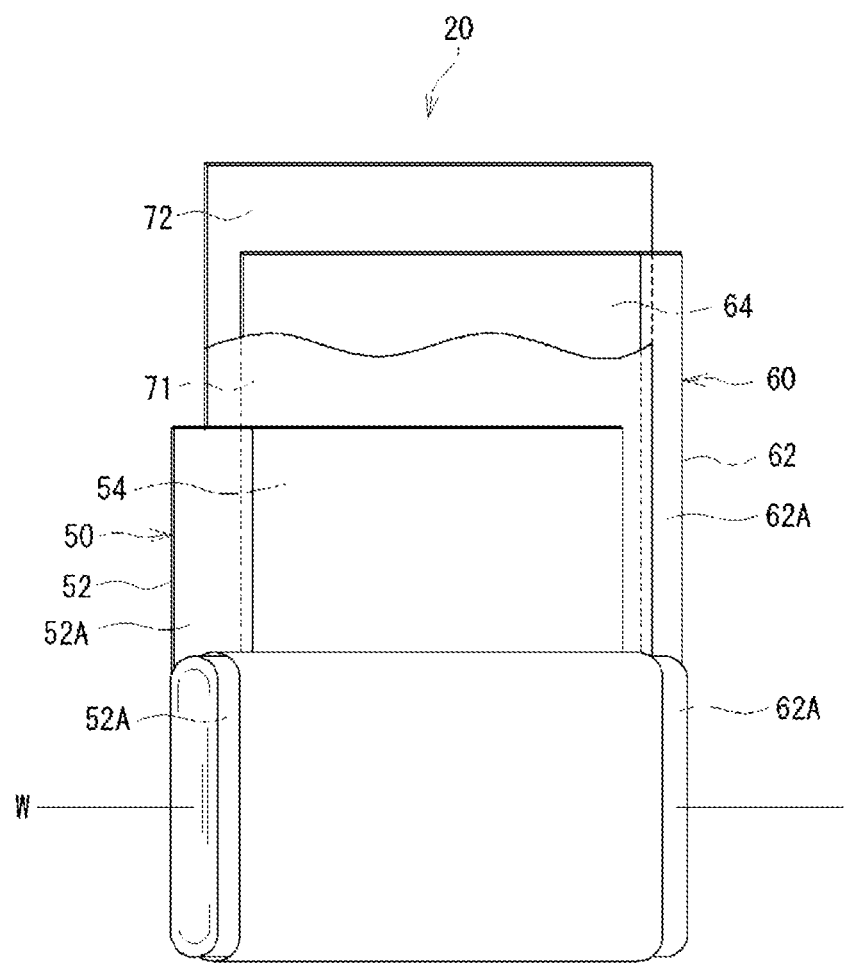
FIG. 2 is a schematic view showing the configuration of a wound electrode body 20 of the non-aqueous electrolyte secondary battery 1 of the present embodiment.

As shown in FIG. 2, in the wound electrode body (hereinafter simply referred to as an "electrode body") 20 of the present embodiment, a long positive electrode body (positive electrode sheet) 50, a long first separator 71, a long negative electrode body (negative electrode sheet) 60, and a long second separator 72 are stacked and wound. Specifically, in the positive electrode body 50, a positive electrode active material layer 54 is formed along a longitudinal direction on one surface or both surfaces (both surfaces in the present embodiment) of a long positive electrode current collector 52. In the negative electrode body 60, a negative electrode active material layer 64 is formed along the longitudinal direction on one surface or both surfaces (both surfaces in the present embodiment) of a long negative electrode current collector 62. A positive electrode active material layer non-formation portion 52A and a negative electrode active material layer non-formation portion 62A are formed so as to extend outward from both sides in a winding axis direction (a sheet width direction orthogonal to the above longitudinal direction) of the electrode body 20. The positive electrode active material layer non-formation portion 52A is a portion in which the positive electrode active material layer 54 is not formed and the positive electrode current collector 52 is exposed. The negative electrode active material layer non-formation portion 62A is a portion in which the negative electrode active material layer 64 is not formed and the negative electrode current collector 62 is exposed. A positive electrode current collector plate 42A and a negative electrode current collector plate 44A (see FIG. 1) are bonded to the positive electrode active material layer non-formation portion 52A and the negative electrode active material layer non-formation portion 62A, respectively. The positive electrode terminal 42 (see FIG. 1)

is electrically connected to the positive electrode current collector plate 42A, and the negative electrode terminal 44 (see FIG. 1) is electrically connected to the negative electrode current collector plate 44A.

As materials and members constituting the positive and negative electrodes of the electrode body 20, it is possible to use the materials and members similar to those used in a conventional typical non-aqueous electrolyte secondary battery without limitation. For example, as the positive electrode current collector 52, it is possible to use the positive electrode current collector used as the positive electrode current collector of the non-aqueous electrolyte secondary battery of this type without particular limitation. Typically, the positive electrode current collector made of metal having excellent conductivity is preferable. For example, it is possible to use a metal material such as aluminum, nickel, titanium, or stainless steel as the positive electrode current collector 52. In particular, aluminum (e.g., aluminum foil) is preferable. Examples of a positive electrode active material of the positive electrode active material layer 54 include lithium composite metal oxides having a layer structure or a spinel structure (e.g., $LiNi_{1/3}Co_{1/3}Mn_{1/3}O_2$, $LiNiO_2$, $LiCoO_2$, $LiFeO_2$, $LiMn_2O_4$, $LiNi_{0.5}Mn_{1.5}O_4$, $LiCrMnO_4$, and $LiFePO_4$). The positive electrode active material layer 54 can be formed by dispersing the positive electrode active material and a material which is used on an as needed basis (a conductive material, a binder, or the like) in a proper solvent (e.g., N-methyl-2-pyrolidone: NMP) to prepare a pasty (or slurry-like) composite, applying an appropriate amount of the composite to the surface of the positive electrode current collector 52, and drying the composite.

As the negative electrode current collector 62, it is possible to use the negative electrode current collector used as the negative electrode current collector of the non-aqueous electrolyte secondary battery of this type without particular limitation. Typically, the negative electrode current collector made of metal having excellent conductivity is preferable, and it is possible to use, e.g., copper (e.g., copper foil) or an alloy having copper as a main component. Examples of a negative electrode active material of the negative electrode active material layer 64 include a particulate (or spherical or scaly) carbon material which includes a graphite structure (layer structure) at least as part of the carbon material, a lithium-transition metal composite oxide (e.g., a lithium-titanium composite oxide such as, e.g., $Li_4Ti_5O_{12}$), and a lithium-transition metal composite nitride. The negative electrode active material layer 64 can be formed by dispersing the negative electrode active material and a material which is used on an as needed basis (a binder or the like) in a proper solvent (e.g., ion-exchanged water) to prepare a pasty (or slurry-like) composite, applying an appropriate amount of the composite to the surface of the negative electrode current collector 62, and drying the composite.

As each of the first separator 71 and the second separator 72, it is possible to use the separator made of a conventionally known porous sheet without limitation. An example of the porous sheet includes the porous sheet (film or unwoven fabric) made of a polyolefin resin such as polyethylene (PE) or polypropylene (PP). Such a porous sheet may have a single-layer structure, or may also have a multiple-layer structure having two or more layers (e.g., a three-layer structure in which PP layers are stacked on both surfaces of a PE layer). In addition, the porous sheet may have a configuration in which a porous heat-resistant layer is provided on one surface or both surfaces of the porous sheet. The heat-resistant layer can be a layer (also referred to as a filler layer) which includes, e.g., an inorganic filler and a binder. As the inorganic filler, for example, alumina, boehmite, or silica can be preferably used.

The non-aqueous electrolyte 10 accommodated in the battery case 30 together with the electrode body 20 contains a supporting electrolyte in a proper non-aqueous solvent, and it is possible to use a conventionally known non-aqueous electrolyte as the non-aqueous electrolyte 10 without particular limitation. For example, as the non-aqueous solvent, it is possible to use ethylene carbonate (EC), diethyl carbonate (DEC), dimethyl carbonate (DMC), or ethyl methyl carbonate (EMC). In addition, as the supporting electrolyte, it is possible to preferably use, e.g., a lithium salt (e.g., LiBOB, $LiPF_6$, or the like). In the present embodiment, LiBOB is used. In this case, the content of LiBOB in the non-aqueous electrolyte 10 is preferably 0.3 to 0.6 wt %.

Figure 3:
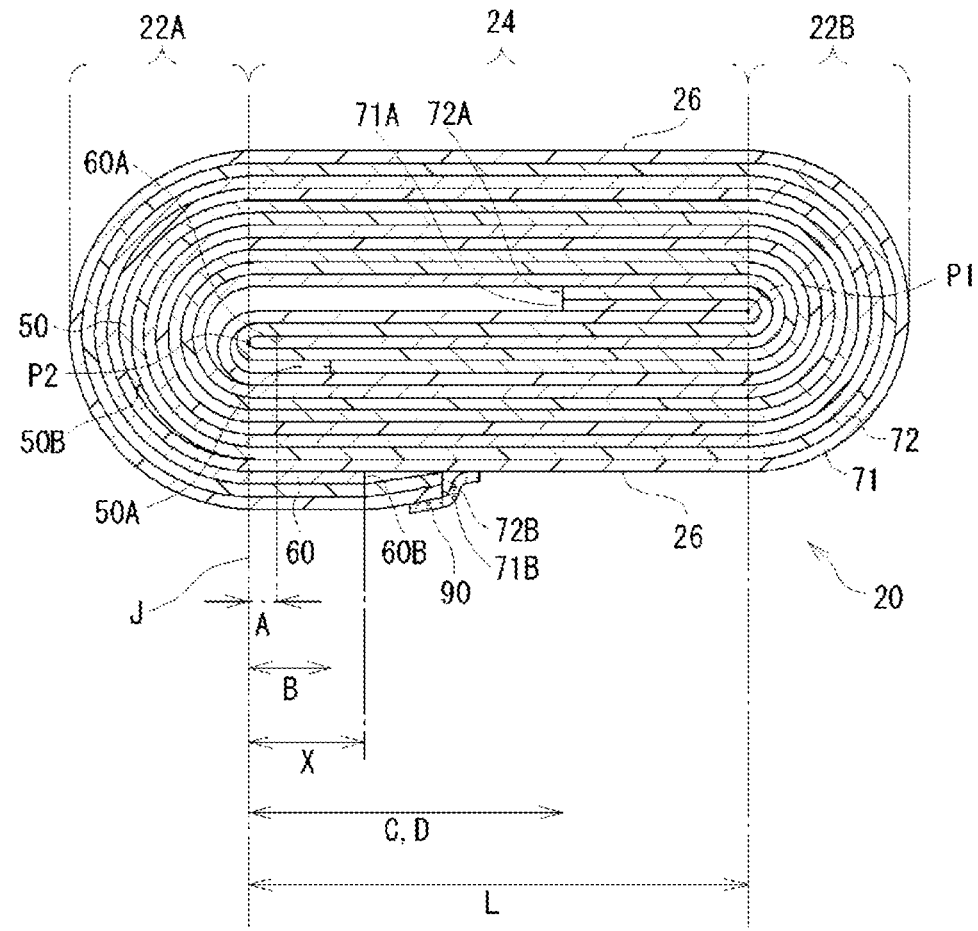
FIG. 3 is a cross-sectional view schematically showing the cross-sectional structure of the wound electrode body 20 of the present embodiment.

Next, a preferred embodiment of the electrode body 20 of the present embodiment will be described in detail with reference to FIG. 3. Note that FIG. 3 schematically shows the structure of the electrode body 20, and gaps in the electrode body 20 shown in FIG. 3 do not reflect the actual sizes of the gaps. The electrode body 20 is bound, and the gaps in the electrode body 20 are thereby reduced.

As shown in FIG. 3, the electrode body 20 has two R portions 22A and 22B, and a flat portion 24. The two R portions 22A and 22B are both end portions in a longitudinal direction (a left and right direction in FIG. 3) orthogonal to a winding axis W (see FIG. 2), in which the outer surfaces of the electrode body 20 are formed of curved surfaces. The flat portion 24 is a central portion disposed between the two R portions 22A and 22B. The flat portion 24 has a pair of flat surfaces 26 at both end portions in a thickness direction (an up and down direction in FIG. 3) in the electrode body 20. In the present embodiment, when the electrode body 20 is bound in the thickness direction, a binding pressure is applied to each of the pair of flat surfaces 26. The electrode body 20 is accommodated in the battery case 30 (main body 31) such that one of the two R portions 22A and 22B faces the lid 32 (see FIG. 1) of the battery case.

As described above, the first separator 71, the negative electrode body 60, the second separator 72, and the positive electrode body 50 are stacked and wound. From the viewpoint of receptivity to a charge carrier, the outermost peripheral portion of the negative electrode body 60 is preferably positioned on the outer peripheral side of a winding ending end 50B of the positive electrode body 50 in the electrode body 20. In addition, the outermost periphery of the electrode body 20 preferably serves as the first separator 71, and the negative electrode body 60 positioned on an outermost peripheral side in the electrode body 20 is preferably covered with the first separator 71 and the second separator 72. With this, the surface of the electrode body 20 is insulated from the inner wall of the battery case 30 more reliably.

Note that, in the present embodiment, as an example, the first separator 71 has the heat-resistant layer (not shown) on one surface of the porous sheet. In addition, in the present embodiment, as an example, the second separator 72 has the heat-resistant layer (not shown) on one surface of the porous sheet. In the present embodiment, the heat-resistant layer of the first separator 71 is formed on the inner peripheral surface of the first separator 71, i.e., the inner peripheral surface of a resin layer of the first separator 71. Consequently, the heat-resistant layer of the first separator 71 is disposed on the side of the positive electrode body 50. In the present embodiment, the heat-resistant layer of the second separator 72 is formed on the outer peripheral surface of the second separator 72, i.e., the outer peripheral surface of a resin layer of the second separator 72. Consequently, the heat-resistant layer of the second separator 72 is disposed on the side of the positive electrode body 50.

The electrode body 20 may be formed into a flat shape by winding the first separator 71, the negative electrode body 60, the second separator 72, and the positive electrode body 50 around a winding core having a flat cross section which is orthogonal to the direction of the winding axis W. In addition, the electrode body 20 may also be formed into a flat shape by, e.g., winding the first separator 71, the negative electrode body 60, the second separator 72, and the positive electrode body 50 into a cylindrical shape and then crushing them from a lateral direction. The electrode body 20 may also be formed by another method.

A winding starting end 71A of the first separator 71 and a winding starting end 72A of the second separator 72 are positioned in the flat portion 24. The first separator 71 and the second separator 72 are preferably wound before the negative electrode body 60 is wound. In addition, the negative electrode body 60 is preferably wound before the positive electrode body 50 is wound. Specifically, in a cross section orthogonal to the winding axis W, a primary bending point from the winding starting ends 71A and 72A of the first separator 71 and the second separator 72 is designated as a first bending point P1. A secondary bending point from the winding starting ends 71A and 72A of the first separator 71 and the second separator 72 is designated as a second bending point P2. The first separator 71 and the second separator 72 are folded back at the first bending point P1, and are then folded back to a side opposite to the winding starting ends 71A and 72A at the second bending point P2 and are wound.

A winding starting end 60A of the negative electrode body 60 is sandwiched by the second separator 72 which is folded back at the second bending point P2, and is wound together with the second separator 72. The winding starting end 60A of the negative electrode body 60 is positioned in the flat portion 24. A winding starting end 50A of the positive electrode body 50 is disposed between the outer peripheral side of the second separator 72 which is folded back at the second bending point P2 and the inner peripheral side of the first separator 71 which is folded back at the second bending point P2, and is wound on the outer peripheral side of the second separator 72. The winding starting end 50A of the positive electrode body 50 is positioned in the flat portion 24. The first separator 71 is wound on the outer peripheral side of the positive electrode body 50. The negative electrode body 60 is wound on the outer peripheral side of the first separator 71.

The outermost peripheral portion of the first separator 71 is disposed at a position on the outer peripheral side of the outermost peripheral portion of the second separator 72. That is, the outermost peripheral portion of the second separator 72 is disposed at a position on the inner peripheral side of the outermost peripheral portion of the first separator 71. Note that neither the positive electrode body 50 nor the negative electrode body 60 is disposed between the outermost peripheral portion of the first separator 71 and the outermost peripheral portion of the second separator 72. Consequently, the outermost peripheral portion of the first separator 71 is in contact with the outermost peripheral portion of the second separator 72.

The outermost peripheral portion of the first separator 71 is a portion which is disposed on the outermost peripheral side in the first separator 71. Consequently, the outermost peripheral portion of the first separator 71 forms the outer peripheral surface of the electrode body 20. In addition, the outermost peripheral portion of the second separator 72 is a portion which is disposed on the outermost peripheral side in the second separator 72. Consequently, the outermost peripheral portion of the second separator 72 is disposed on the inner peripheral side of the outermost peripheral portion of the first separator 71 by one layer.

A winding ending end 60B of the negative electrode body 60 is covered from the outer peripheral side with a pair of separators formed of the outermost peripheral portion of the first separator 71 and the outermost peripheral portion of the second separator 72. That is, the winding ending end 60B of the negative electrode body 60 is disposed at a position on the inner peripheral side of the outermost peripheral portion of the first separator 71 and the outermost peripheral portion of the second separator 72. The winding ending end 60B of the negative electrode body 60 is positioned in the flat portion. The winding ending end 50B of the positive electrode body 50 is disposed at a position on the inner peripheral side of the outermost peripheral portion of the negative electrode body 60. As an example, the winding ending end 50B of the positive electrode body 50 is positioned in one of the two R portions 22A and 22B (e.g., the R portion 22A). Consequently, the outermost peripheral portion of the negative electrode body 60 is disposed at a position on the outer peripheral side of the outermost peripheral portion of the positive electrode body 50.

A winding ending end 71B of the first separator 71 is preferably fastened to the outer peripheral surface of the first separator 71 on the inner peripheral side by one layer together with the winding ending end 72B of the second separator 72 using an adhesive tape 90. Note that the adhesive tape 90 may be bonded to at least part of the first separator 71 in a width direction (a left and right direction in FIG. 2, a direction of depth relative to the plane of paper in FIG. 3). Note that the adhesive tape 90 is disposed in the flat portion 24 of the electrode body 20, whereby, even in the case where an impact is given to the electrode body 20, the adhesive tape 90 is not easily peeled.

Herein, it is assumed that a straight line which passes through the second bending point P2 and is orthogonal to the two flat surfaces 26 of the flat portion 24 is a bending end straight line J. A direction in which each of the two flat surfaces 26 extends is used as a reference direction. In the cross section orthogonal to the winding axis W, A represents a distance from the bending end straight line J to the winding starting end 60A of the negative electrode body 60 in the reference direction. In the cross section orthogonal to the winding axis W, B represents a distance from the bending end straight line J to the winding starting end 50A of the positive electrode body 50 in the reference direction. In the cross section orthogonal to the winding axis W, X represents a distance from the bending end straight line J to the winding ending end 60B of the negative electrode body 60 in the reference direction. At this point, the distances A, B, and X satisfy the following relationship: A<B<X. In the cross section orthogonal to the winding axis W, the winding starting end 60A of the negative electrode body 60, the winding starting end 50A of the positive electrode body 50, and the winding ending end 60B of the negative electrode body 60 are disposed at positions close to the bending end straight line J such that the winding starting end 60A is closer to the bending end straight line J than the winding starting end 50A, and the winding starting end 50A is closer to the bending end straight line J than the winding ending end 60B, and the positions are displaced from each other in the reference direction. With this, gaps in the electrode body 20 are reduced. The gaps in the electrode body 20 include at least any of the gap between the winding starting end 60A of the negative electrode body 60 and the separator, the gap between the winding starting end 50A of the positive electrode body 50 and the separator, and the gap between the winding ending end 60B of the negative electrode body 60 and the separator. Therefore, it is possible to reduce the possibility that variations occur in current density in the electrode body 20, and a difference in electrical resistance is locally caused. With this, it is possible to prevent ions in the non-aqueous electrolyte from being deposited as metal to prevent a reduction in battery performance. Note that a gap formed by folding back the first separator 71 and the second separator 72 at the first bending point P1 does not influence battery reaction. In addition, in general, the first separator 71 and the second separator 72 are thinner and softer than the positive electrode body 50 and the negative electrode body 60. Consequently, the gaps are significantly reduced by binding the electrode body 20.

In the cross section orthogonal to the winding axis W, L represents the length of the flat portion 24 between the first bending point P1 and the second bending point P2. At this point, the distances A, B, and X and the length L preferably satisfy the following relationships: $0 \leq A/L \leq 0.15$; $0.025 \leq B/L \leq 0.375$; and $0.05 \leq X/L$ while satisfying $A<B<X$. In this case, as indicated by the test result of an evaluation test described later, it is possible to further prevent the deposition of the metal to further prevent the reduction in battery performance.

In addition, in the cross section orthogonal to the winding axis W, C represents a distance from the bending end straight line J to the winding starting end 71A of the first separator 71 in the reference direction. In the cross section orthogonal to the winding axis W, D represents a distance from the bending end straight line J to the winding starting end 72A of the second separator 72 in the reference direction. At this point, the distances C, D, and X and the length L preferably satisfy the following relationships: $X \leq C < L$; and $X \leq D < L$. In this case, the gaps in the electrode body 20 including the gap between the winding starting end 60A of the negative electrode body 60 and the separator are reduced more. Consequently, it is possible to further prevent the deposition of the metal to further prevent the reduction in battery performance.

Next, a description will be given of the test result of the evaluation test which uses Examples and Comparative Examples. In each of Examples and Comparative Examples, the lithium ion secondary battery which was an example of the non-aqueous electrolyte secondary battery was used. The result of the evaluation test is shown in Table 1.

Herein, it is assumed that $A<B<X$ is Condition 1, $0 \leq A/L \leq 0.15$ is Condition 2, $0.025 \leq B/L \leq 0.375$ is Condition 3, $0.05 \leq X/L$ is Condition 4, $X \leq C < L$ is Condition 5, and $X \leq D < L$ is Condition 6. The lithium ion secondary battery according to each of Examples 1 to 8 satisfies all of Conditions 1 to 6. The lithium ion secondary battery according to Comparative Example 1 satisfies Conditions 4 to 6, but does not satisfy Conditions 1 to 3. The lithium ion secondary battery according to Comparative Example 2 satisfies Condition 4, but does not satisfy Conditions 1, 2, 3, 5, and 6. The lithium ion secondary battery according to Comparative Example 3 also satisfies Condition 4, but does not satisfy Conditions 1, 2, 3, 5, and 6.

In the evaluation test, the lithium ion secondary battery was adjusted so as to have a state of charge (SOC) of 90% (a charge state of 90% of a rated capacity), and a charge-discharge cycle test was performed in a low temperature range (herein, $-10°$ C.). Specifically, in the charge-discharge cycle test, an operation in which charge was performed for five seconds at a current rate of 35 C, the operation was suspended for a predetermined period of time, discharge was performed for five seconds at the same rate, and the operation was suspended for a predetermined period of time was used as one cycle, and the cycle was repeatedly performed 1000 times. After the charge-discharge cycle test was performed, the output and resistance increase rate of the lithium ion secondary battery were measured. In addition, the lithium ion secondary battery was disassembled and, through observation, it was determined whether or not ions (lithium ions) in the non-aqueous electrolyte were deposited as metal (lithium).

As the result of the evaluation test, the output of the lithium ion secondary battery according to each of Comparative Examples 2 and 3 was 207 W, and the output of the lithium ion secondary battery according to Comparative Example 1 was 185 W which was slightly lower. The resistance increase rate of the lithium ion secondary battery according to each of Comparative Examples 1 to 3 was 103%. The deposition of lithium was observed for each of the lithium ion secondary batteries according to Comparative Examples 1 to 3.

TABLE 1

|  | A/L | B/L | X/L | C/L | D/L | Li deposition | Output [W] | Resistance increase rate [%] |
| --- | --- | --- | --- | --- | --- | --- | --- | --- |
| Comparative Example 1 | 0.6 | 0.575 | 0.5 | 0.6 | 0.6 | observed | 185 | 103 |
| Comparative Example 2 | 0.8 | 0.775 | 0.75 | 0.6 | 0.6 | observed | 207 | 103 |
| Comparative Example 3 | 1.025 | 1.05 | 1 | 0.6 | 0.6 | observed | 207 | 103 |
| Example 1 | 0 | 0.1625 | 0.4 | 0.6 | 0.6 | not observed | 207 | 103 |
| Example 2 | 0.15 | 0.1625 | 0.4 | 0.6 | 0.6 | not observed | 208 | 103 |
| Example 3 | 0.15 | 0.375 | 0.4 | 0.6 | 0.6 | not observed | 207 | 103 |
| Example 4 | 0.15 | 0.375 | 0.4 | 0.6 | 0.6 | not observed | 207 | 103 |
| Example 5 | 0 | 0.025 | 0.05 | 0.6 | 0.6 | not observed | 207 | 103 |
| Example 6 | 0.025 | 0.05 | 0.1 | 0.6 | 0.6 | not observed | 207 | 103 |
| Example 7 | 0.15 | 0.175 | 0.2 | 0.6 | 0.6 | not observed | 207 | 103 |
| Example 8 | 0.15 | 0.375 | 0.6 | 0.6 | 0.6 | not observed | 207 | 103 |

On the other hand, as the result of the evaluation test, the output of the lithium ion secondary battery according to each of Example 1 and Examples 3 to 8 was 207 W, and the output of the lithium ion secondary battery according to Example 2 was 208 W. The resistance increase rate of the lithium ion secondary battery according to each of Examples 1 to 8 was 103%. The deposition of lithium was not observed for each of the lithium ion secondary batteries according to Examples 1 to 8.

When the test result of Comparative Examples was compared with the test result of Examples, the deposition of lithium was observed in Comparative Examples, but the deposition of lithium was not observed in Examples. That is, the deposition of lithium was observed in the case where Conditions 1 to 3 were not satisfied and, even when Condition 4 was satisfied, in the case where the other Conditions were not satisfied, the deposition of lithium was observed. On the other hand, in the case where not only Conditions 1 to 3 but Conditions 1 to 6 were satisfied, the deposition of lithium was not observed. This may be because, in the case where Conditions 1 to 6 are satisfied, the gaps in the electrode body are reduced, and it is possible to prevent the deposition of lithium. In addition, even when Conditions 4 to 6 are satisfied, in the case where Conditions 1 to 3 are not satisfied, the gaps in the electrode body may not be reduced effectively.

Note that the electrode body 20 is used in a state in which the electrode body 20 is bound from both sides of the two flat surfaces 26 of the flat portion 24. The electrode body 20 may be bound by a binding member. In addition, the electrode body 20 may also be bound by plate surfaces of the battery case 30 (main body 31) which face the flat surfaces 26. In addition, the electrode body 20 may be bound from the outside of the battery case 30 (main body 31) of the non-aqueous electrolyte secondary battery 1. Further, a plurality of the non-aqueous electrolyte secondary batteries 1 may be arranged in a direction in which the flat surfaces 26 of the electrode bodies 20 in the adjacent battery cases 30 face each other, and may be used as a battery pack. The entire battery pack may be bound by the binding member, and the electrode body 20 of each non-aqueous electrolyte secondary battery 1 may be bound from both sides of the two flat surfaces 26 of the flat portion 24. Note that the electrode body 20 is preferably bound at a binding load of 3 kN or more and 12 kN or less.

Figure 4:
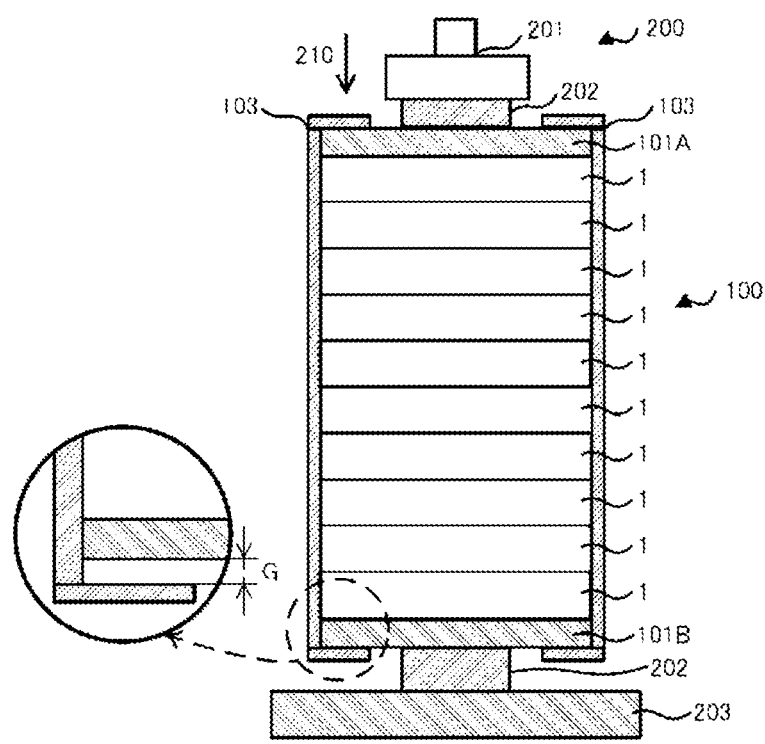
FIG. 4 is a schematic view for explaining a measuring apparatus 200.

The binding load for binding the electrode body 20 can be measured by using a measuring apparatus. A measuring apparatus 200 which is an example of the measuring apparatus and a measuring method of the binding load will be described with reference to FIG. 4. The measuring apparatus 200 includes an autograph 201, two press jigs 202, and a base 203. In the measuring method described herein, as an example, the binding load of a battery pack 100 in which a plurality of the non-aqueous electrolyte secondary batteries 1 are arranged is measured. In the battery pack 100, a plurality of the non-aqueous electrolyte secondary batteries 1 are arranged in the direction in which the flat surfaces 26 of the electrode bodies 20 in the adjacent battery cases 30 face each other. The entire battery pack 100 is sandwiched between two end plates 101A and 101B from both sides (un upper side and a lower side in FIG. 4) in a direction in which a plurality of the non-aqueous electrolyte secondary batteries 1 are arranged, and is bound by binding sheet metal 103.

One of the press jigs 202 is disposed on the base 203. The autograph 201 is disposed on the other press jig 202. The battery pack 100 is set in the measuring apparatus 200 such that the two press jigs 202 are disposed outside the end plates 101A and 101B on both sides. When the end plate 101A on the upper side is pressed downward (in a direction of an arrow 210) by the press jig 202, the battery pack 100 sandwiched between the end plates 101A and 101B is slightly compressed. With this, a small gap G is formed between the end plate 101B on the lower side and the binding sheet metal 103. The autograph is adjusted such that the gap G becomes a gap within a predetermined range, and the binding load is measured. Thus, it is possible to measure the binding load for binding the non-aqueous electrolyte secondary battery 1.

Note that the technique disclosed in the above embodiment is only an example. Consequently, it is possible to change the technique described by way of example in the above embodiment. For example, various conditions (e.g., test temperature and time periods of charge and discharge) in the charge-discharge cycle test may be changed in accordance with the configuration and material of the non-aqueous electrolyte secondary battery. Consequently, the various conditions described by way of example in the above embodiment may be changed in accordance with the configuration and material of the non-aqueous electrolyte secondary battery.

What is claimed is:

1. A non-aqueous electrolyte secondary battery comprising:
    a wound electrode body in which a first separator, a negative electrode body, a second separator, and a positive electrode body are stacked and wound,
    wherein the wound electrode body has
    two R portions which are both end portions in a longitudinal direction orthogonal to a winding axis, wherein outer surfaces of the wound electrode body are formed of curved surfaces, and
    a flat portion which is a central portion disposed between the two R portions and has two flat surfaces,
    wherein a winding starting end of the positive electrode body, a winding starting end of the negative electrode body, a winding starting end of the first separator, a winding starting end of the second separator and a winding ending end of the negative electrode body are positioned in the flat portion, and
    in a cross section orthogonal to the winding axis, the wound electrode body comprises
    a first bending point which represents a primary bending point from the winding starting ends of the first separator and the second separator, and
    a second bending point which represents a secondary bending point from the winding starting ends of the first separator and the second separator, and wherein
    the winding starting end of the negative electrode body is sandwiched by the second separator which is folded back at the second bending point, and is wound together with the second separator,
    the winding starting end of the positive electrode body is disposed between an outer peripheral side of the second separator which is folded back at the second bending point and the inner peripheral side of the first separator which is folded back at the second bending point, and is wound on the outer peripheral side of the second separator,
    a distance from a bending end straight line, which is a straight line which passes through the second bending point and is orthogonal to the two flat surfaces, to the winding starting end of the negative electrode body in a reference direction is denoted by A, a distance from the bending end straight line to the winding starting end of the positive electrode body in the reference direction in the cross section is denoted by B, and a distance from the bending end straight line to the winding ending end of the negative electrode body in the reference direction in the cross section is denoted by X, A, B, and X satisfy the following relationship:

$$A<B<X.$$

2. The non-aqueous electrolyte secondary battery according to claim 1, wherein, when a length of the flat portion between the first bending point and the second bending point in the cross section is denoted by L, A, B, X, and L satisfy the following relationships:

$$0 \leq A/L \leq 0.15;$$

$$0.025 \leq B/L \leq 0.375; \text{ and}$$

$$0.05 \leq X/L.$$

3. The non-aqueous electrolyte secondary battery according to claim 1, wherein the first separator and the second separator are folded back at the first bending point, and are then folded back to a side opposite to the winding starting ends of the first separator and the second separator at the second bending point and are wound, and when a length of the flat portion between the first bending point and the second bending point in the cross section is denoted by L, a distance from the bending end straight line to the winding starting end of the first separator in the reference direction in the cross section is denoted by C, and a distance from the bending end straight line to the winding starting end of the second separator in the reference direction in the cross section is denoted by D, C, D, L, and X satisfy the following relationships:

$$X \leq C < L; \text{ and}$$

$$X \leq D < L.$$

* * * * *